US 11,689,944 B2

(12) United States Patent
Vasudevan et al.

(10) Patent No.: US 11,689,944 B2
(45) Date of Patent: Jun. 27, 2023

(54) TRAFFIC FLOW CLASSIFICATION USING MACHINE LEARNING

(71) Applicant: Hughes Network Systems, LLC, Germantown, MD (US)

(72) Inventors: Sriram Vasudevan, Germantown, MD (US); Kaustubh Jain, Germantown, MD (US); Chi-Jiun Su, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 78 days.

(21) Appl. No.: 17/131,646

(22) Filed: Dec. 22, 2020

(65) Prior Publication Data

US 2021/0204152 A1 Jul. 1, 2021

Related U.S. Application Data

(60) Provisional application No. 62/955,923, filed on Dec. 31, 2019.

(51) Int. Cl.
*H04W 24/00* (2009.01)
*H04W 24/08* (2009.01)
(Continued)

(52) U.S. Cl.
CPC .......... *H04W 24/08* (2013.01); *G06N 20/00* (2019.01); *H04W 24/10* (2013.01); *H04W 28/24* (2013.01)

(58) Field of Classification Search
CPC ......... G06N 20/00; H04L 12/24; H04L 12/26; H04L 12/851; H04L 41/145;
(Continued)

(56) References Cited

U.S. PATENT DOCUMENTS 5,812,526 A 9/1998 Chang et al.
5,995,805 A 11/1999 Ogasawara et al.
(Continued)

FOREIGN PATENT DOCUMENTS

GB 2582165 9/2020

OTHER PUBLICATIONS

Wang et al., A Framework for QoS-aware Traffic Classification Using Semi-supervised Machine Learning in SDNs, IEEE, 6 pages, 2016.*

(Continued)

*Primary Examiner* — Frank Duong
(74) *Attorney, Agent, or Firm* — Fish & Richardson P.C.

(57) ABSTRACT

Methods, systems, and apparatus, including computer programs encoded on computer-storage media, for traffic flow classification using machine learning. In some implementations, a communication device includes an anomaly detector comprising a machine learning model trained to predict whether data traffic patterns differ from a set of observed traffic patterns present in a set of training data. The communication device includes a traffic classifier comprising a machine learning model trained to predict a quality of service (QoS) class for network connections or data flows. The communication device is configured to evaluate network connections or data flows using the anomaly detector. The communication device may (i) use the traffic classifier to predict QoS classes for traffic that the anomaly detector predicts to be similar to the observed traffic patterns, and (ii) store data traffic that the anomaly detector predicts to be different from the observed traffic patterns.

20 Claims, 7 Drawing Sheets

(51) Int. Cl.
*G06N 20/00* (2019.01)
*H04W 24/10* (2009.01)
*H04W 28/24* (2009.01)

(58) Field of Classification Search
CPC ..... H04L 41/147; H04L 43/026; H04L 43/04; H04L 47/127; H04L 47/2441; H04L 47/823; H04W 24/08; H04W 24/10; H04W 28/24
See application file for complete search history.

(56) References Cited

U.S. PATENT DOCUMENTS

| | | | |
|---|---|---|---|
| 6,650,869 | B2 | 11/2003 | Kelly et al. |
| 6,882,623 | B1 | 4/2005 | Goren et al. |
| 6,947,378 | B2 | 9/2005 | Wu et al. |
| 6,987,741 | B2 | 1/2006 | Kelly et al. |
| 7,099,330 | B2 | 8/2006 | Chiussi et al. |
| 7,130,283 | B2 | 10/2006 | Vogel et al. |
| 7,336,967 | B2 | 2/2008 | Kelly et al. |
| 7,619,968 | B2 | 11/2009 | Kelly et al. |
| 7,656,813 | B2 | 2/2010 | Kloper |
| 7,668,966 | B2 | 2/2010 | Klinker et al. |
| 8,559,465 | B2 | 10/2013 | Brooks et al. |
| 8,675,486 | B2 | 3/2014 | Friedman et al. |
| 8,681,614 | B1 | 3/2014 | McCanne et al. |
| 8,687,493 | B2 | 4/2014 | Torres et al. |
| 9,294,380 | B2 | 3/2016 | Rubio Vidales et al. |
| 9,325,951 | B2 | 4/2016 | Saptharishi |
| 9,349,102 | B2 | 5/2016 | Sen et al. |
| 9,686,204 | B2 | 6/2017 | Kakadia et al. |
| 9,832,276 | B2 | 11/2017 | Torres et al. |
| 9,838,296 | B2 | 12/2017 | Armolavicius et al. |
| 9,967,188 | B2 | 5/2018 | Kanonakis et al. |
| 9,973,580 | B2 | 5/2018 | Khan et al. |
| 10,110,300 | B2 | 10/2018 | Xu et al. |
| 10,243,801 | B2 | 3/2019 | Xu et al. |
| 10,320,813 | B1* | 6/2019 | Ahmed ............... H04L 63/1416 |
| 10,341,241 | B2 | 7/2019 | Su et al. |
| 10,454,804 | B2 | 10/2019 | Jain et al. |
| 10,594,027 | B1 | 3/2020 | Arora et al. |
| 10,594,616 | B2 | 3/2020 | Torres et al. |
| 10,652,765 | B2 | 5/2020 | Jain et al. |
| 10,791,162 | B2 | 9/2020 | Su et al. |
| 10,902,287 | B2 | 1/2021 | Zaifman et al. |
| 10,958,546 | B2 | 3/2021 | Jain et al. |
| 10,999,204 | B2 | 5/2021 | Tsilimantos et al. |
| 11,032,176 | B2 | 6/2021 | Jain et al. |
| 11,182,452 | B2 | 11/2021 | Su et al. |
| 2001/0043573 | A1 | 11/2001 | Kelly |
| 2003/0027522 | A1 | 2/2003 | Valdivia et al. |
| 2013/0080641 | A1 | 3/2013 | Lui et al. |
| 2013/0166730 | A1 | 6/2013 | Wilkinson |
| 2015/0289279 | A1 | 10/2015 | Xu et al. |
| 2015/0296409 | A1 | 10/2015 | Xu et al. |
| 2016/0088627 | A1 | 3/2016 | Tayrac et al. |
| 2016/0330746 | A1 | 11/2016 | Mehrabanzad et al. |
| 2017/0250751 | A1 | 8/2017 | Kargieman et al. |
| 2018/0131593 | A1 | 5/2018 | Jain et al. |
| 2018/0131620 | A1* | 5/2018 | Su ..................... H04L 47/2441 |
| 2018/0152467 | A1* | 5/2018 | Anderson ........... H04L 63/1425 |
| 2018/0198838 | A1 | 7/2018 | Murgia et al. |
| 2018/0219979 | A1 | 8/2018 | Javall et al. |
| 2019/0013860 | A1 | 1/2019 | Xu et al. |
| 2019/0137985 | A1 | 5/2019 | Celia et al. |
| 2019/0140952 | A1 | 5/2019 | Torres et al. |
| 2020/0169509 | A1* | 5/2020 | Tigli ..................... H04L 41/40 |
| 2020/0204983 | A1 | 6/2020 | Khan et al. |
| 2021/0044572 | A1 | 2/2021 | Liu et al. |
| 2021/0081466 | A1 | 3/2021 | Su et al. |
| 2021/0092036 | A1 | 3/2021 | Jain et al. |
| 2021/0203410 | A1 | 7/2021 | Khan et al. |
| 2021/0204011 | A1 | 7/2021 | Jain et al. |
| 2021/0204300 | A1 | 7/2021 | Hu et al. |

OTHER PUBLICATIONS

Pacheco et al., "Towards the deployment of machine learning solutions in network traffic classification: a systematic survey," IEEE Communications Surveys & Tutorials, May 2019, 21(2):1988-2014.

PCT International Search Report and Written Opinion in International Appln. No. PCT/US2020/066665, dated Mar. 15, 2021, 15 pages.

Boutaba et al., "A comprehensive survey on machine learning for networking: evolution, applications and research opportunities," Journal of Internet Services and Applications, Jun. 21, 2018, 9(16), 99 pages.

Camarda et al., "A dynamic bandwidth resource allocation based on neural networks in euroskyway multimedia satellite system," International Journal of Communication Systems, 2002, pp. 1-25.

Chiti et al., "Energy Efficient Communications for Reliable IoT Multicast 5G/Satellite Services," Future Internet, Jul. 2019, 11(164), 14 pages.

codeontechnologies.com [online], "Efficient multicast of updates to satellite connected devices," available on or before Nov. 8, 2021, via internet Archive: Wayback Machine URL< retrieved on Feb. 2, 2022, retrieved from URL <https://www.codeontechnologies.com/news-and-blog/jwhxu9erbgefwa3wrtsz7241ia3sfr>, 4 pages.

Fourati et al., "Artificial Intelligence for Satellite Communication: A Review," Jan. 2021, arxiv, pp. 1-20.

Gijon et al., "Encrypted Traffic Classification Based on Unsupervised Learning in Cellular Radio Access Networks," IEEE Access, Apr. 2016:1-13.

Hughes, "HN System," System Overview, Hughes Brazil, Jul. 2007, 5.3, 114 pages.

Hughes, "HX System," System Overview, Sep. 2008, 1.2.7, 106 pages.

International Preliminary Report on Patentability in International Appln. No. PCT/US2020/066522, dated Jul. 14, 2022, 8 pages.

International Preliminary Report on Patentability in International Appln. No. PCT/US2020/066665, dated Jul. 14, 2022, 9 pages.

International Search Report and Written Opinion in International Appln. No. PCT/US2020/066522, dated Apr. 30, 2021, 15 pages.

juniper.net [online], "Managing Satellite Software Upgrade Groups in a Junos Fusion," Dec. 17, 2021, retrieved on Feb. 2, 2022, retrieved from URL<https://www.juniper.net/documentation/us/en/software/junos/fusion-enterprise/topics/task/fusion-satellite-software-upgrade-groups.html>, 7 pages.

orth.uk [online], "FlatBuffers for TensorFlow Lite, with a bonus about quantization," Apr. 16, 2021, retrieved on Feb. 2, 2022, retrieved from U: <https://orth.uk/flatbuffers/>, 5 pages.

rapid7.com [online], "What is Network Traffic Analysis (NTA)?," available on or before Apr. 11, 2021, via Internet Archive: Wayback Machine URL <http://web.archive.org/web/20210411034307/https://www.rapid7.com/fundamentals/network-traffic-analysis/>, retrieved on Feb. 2, 2022, retrieved from URL <https://www.rapid7.com/fundamentals/network-traffic-analysis/>, 12 pages.

Sun et al., "IP Multicast Over Satellite," American Institute of Aeronautics and Astronautics, 2003, 11 pages.

Sun et al., "Networking Issues in IP Multicast over Satellite," International Journal of Satellite Communications and Networking, 2003, 21:489-507.

tensorflow.org [online], "Deploy machine learning models on mobile and IoT devices," available on or before Feb. 24, 2021, via Internet Archive: Wayback Machine URL <http://web.archive.org/web/20210224104033/https://www.tensorflow.org/lite>, retrieved on Jan. 28, 2022, retrieved from URL <https://www.tensorflow.org/lite>, 7 pages.

tensorflow.org [online], "Model optimization," Apr. 2020, retrieved on Feb. 2, 2022, retrieved from URL <https://www.tensorflow.org/lite/performance/model_optimization>, 6 pages.

tensorflow.org [online], "TensorFlow Lite converter," Oct. 2020, retrieved on Feb. 2, 2022, retrieved from URL <https://www.tensorflow.org/lite/convert/index>, 9 pages.

tensorflow.org [online], "TensorFlow Lite," available on or before May 11, 2021, via Internet Archive: Wayback Machine URL

(56) References Cited

OTHER PUBLICATIONS

<http://web.archive.org/web/2021*/https://www.tensorflow.org/lite/guide>, retrieved on Feb. 2, 2022, retrieved from URL <https://www.tensorflow.org/lite/guide>, 4 pages.
U.S. Appl. No. 16/732,252, filed Dec. 31, 2019, 55 pages.
U.S. Appl. No. 17/555,055, filed Dec. 17, 2021, 66 pages.
wikipedia.org [online], "Traffic classification," Sep. 23, 2021, retrieved on Feb. 2, 2022, retrieved from URL <https://en.m.wikipedia.org/wiki/Traffic_classification, 5 pages.
He et al., "A Meta-Learning Scheme for Adaptive Short-Term Network Traffic Prediction," IEEE Journal on Selected Areas in Communications, Oct. 2020, 38(10):2271-2283.

\* cited by examiner

TRAFFIC FLOW CLASSIFICATION USING MACHINE LEARNING

CROSS-REFERENCE TO RELATED APPLICATIONS

This application claims the benefit of U.S. Provisional Application Ser. No. 62/955,923, filed Dec. 31, 2019, which is incorporated by reference.

BACKGROUND

Communication systems transfer many different types of data between many different systems. To provide the service needed for different applications, data streams may be handled differently according to the type of data being transferred, e.g., a web page, a streaming video, a file upload, a video conference call, etc.

SUMMARY

In some implementations, a communication system is configured to classify data traffic, including data that is encrypted. The classification determined can be used to assign a quality of service class or priority for service in the network. The communication system can be configured to classify encrypted and unencrypted traffic in real-time based on measured traffic characteristics. The system can be configured to automatically update models used for traffic classification, to ensure the models do not degrade in performance when new traffic patterns are encountered. For example, terminals can collect information about unusual traffic patterns, provide the data to a gateway or other system, and then receive updated traffic classification models that have been refined using the collected information.

In many systems, different data flows are assigned priority levels (e.g., quality of service (QoS) classes), and the limited available communication bandwidth is allocated based on the priority levels. A classifier determines the priority levels for connections and data flows, and a scheduler then schedules communications based on the priority levels. Data is increasingly being encrypted, however, which can make classification difficult because the data being transferred generally cannot be accessed and used for classification.

A classifier can use statistical patterns of data traffic to identify types of data flows that are present, even if the data flows are encrypted. These patterns can include packet-level statistics, such as frequency and consistency of packet transmissions, amounts of packets in a flow, and so on. A machine learning model can be trained, based on examples in a set of training data, to detect common types of data flows, e.g., corresponding to real-time calls (e.g., voice over Internet protocol (VOIP) traffic), web page transfers and other interactive situations, file transfers, media streaming, and so on. However, when the trained machine learning model is deployed and used, the model may encounter data traffic flows that do not fit the types or classes of data flows that the model has been trained to detect.

To address this situation and allow the system to learn to detect new types of data, a portion of the system can be configured to detect anomalous data flows. When traffic is identified that differs from previously established data flow types, the data can be labelled and collected, and then provided to one or more other devices for further training of machine learning models. Updated machine learning models can then be provided that can account for the previously unrecognized data flow characteristics. For example, the updated model(s) may be trained to assign the data that was previously unrecognizable to a new class or category of data traffic or to assign the data to an existing class or category that is most appropriate. In this manner, there is a flow of communication between the traffic classifiers and model training system, allowing the classification models to be automatically updated and refined as new traffic patterns are encountered.

In some implementations, the traffic classifier includes at least two machine-learning-based models, an anomaly detector and a traffic classifier. The anomaly detector examines traffic (e.g., packet statistics) to identify traffic that appears to be different from the classes of traffic that the traffic classifier is trained to identify. Non-anomalous traffic is then classified by the traffic classifier into the predetermined categories the traffic classifier is trained to predict, while the anomalous traffic is handled separately. The anomalous traffic, or at least statistics and/or metadata for the traffic, is stored and can used to update the training of both the anomaly detector and the traffic classifier.

Some implementations include multiple classifiers for traffic. As an example, when a data flow starts, for example, when a TCP SYN message is received for a network domain or IP address, a first history-based classifier of the system can issue a classification prediction based on a history of previous connections to the network domain or IP address. A second classifier, which uses a machine learning model, can monitor the traffic characteristics and issue classification decisions. For example, the second classifier can determine or estimate when each HTTP object ends and then make a classification decision for each HTTP object. A third element of the system can monitor confidence scores output by history-based first classifier and the machine-learning-based second classifier, and make a refined prediction about the connection based on outputs of both of the classifiers.

To ensure robustness of the system and to improve accuracy of classification, an anomaly detector can be included to identify traffic that does not match recognized patterns. The anomaly detector can be configured to filter out irregular traffic before routing traffic to the traffic classifier. The system can use anomalous traffic to improve the overall ensemble of classifiers.

A machine learning system for traffic classification can thus include three main components: an anomaly detector, a machine learning classifier, and a history-based classifier. The anomaly detector aids in improving both itself and the machine-learning-based classifier to increasingly improve accuracy of classification for new traffic classes and traffic patterns. The machine-learning-based classifier can then be used to improve the history-based classifier to provide a better prior probability about the connection's quality of service class.

The techniques can be used to provide one or more of the following advantages. For example, satellite terminals having classification models that operate and are updated as described herein may provide better user experience by more accurately servicing traffic according to the correct QoS class. This also allows optimizing overall system performance to better allocate bandwidth at the system level. The techniques can help provide accurate, reliable, and low-latency traffic classification, which can result in better service offered to more QoS sensitive traffic. This can be especially useful at times of traffic congestion (e.g., busy hours or other peak utilization times).

In one general aspect, a communication device includes: an anomaly detector comprising a machine learning model trained to predict whether data traffic patterns differ from a set of observed traffic patterns present in a set of training data; and a traffic classifier comprising a machine learning model trained to predict a quality of service (QoS) class for network connections or data flows; wherein the communication device is configured to evaluate network connections or data flows using the anomaly detector, wherein the communication device is configured to (i) use the traffic classifier to predict QoS classes for traffic that the anomaly detector predicts to be similar to the observed traffic patterns, and (ii) store data traffic that the anomaly detector predicts to be different from the observed traffic patterns.

In some implementations, the communication device is further configured to: periodically send the stored data traffic that the anomaly detector predicts to be different from the observed traffic patterns to a machine learning model update system; and receive an updated anomaly detector and an updated traffic classifier that each have a training state that is updated based on traffic labeled anomalous by the anomaly detector of one or more terminals.

In some implementations, the communication device is further configured assign a default QoS class to traffic that the anomaly detector predicts to be different from the observed traffic patterns.

In some implementations, to assign the default QoS class, the communication device is configured to bypass evaluation by the traffic classifier of the traffic that the anomaly detector predicts to be different from the observed traffic patterns.

In some implementations, the communication device is a satellite communication device.

In some implementations, the communication device includes a history-based classifier configured to predict a QoS class for traffic based on history data indicating prior QoS classes assigned to connections.

In some implementations, the history-based classifier is configured to predict the QoS class based on input comprising at least one of an IP address, a server name indication, a domain name, or a fully qualified domain name.

In some implementations, the communication device includes a selector configured to select between a first QoS class predicted by the traffic classifier and a second QoS class predicted by the history-based classifier; and store the selected QoS class in connection history data used by the history-based classifier.

In some implementations, the communication device is configured to identify a beginning and end of objects in network connections, wherein the traffic classifier is configured to output a prediction of a QoS class for each of the objects in the network connections.

In some implementations, the anomaly detector and the traffic classifier are each configured to generate predictions for encrypted data traffic based on at least one of packet-level information, object-level information, or application layer information.

In some implementations, the machine learning model of the anomaly detector comprises a trained neural network, and wherein the machine learning model of the traffic classifier comprises a trained neural network. Other types of models that may be used include support vector machines, regression models, reinforcement learning models, clustering models, decision trees, random forest models, genetic algorithms, Bayesian models, and Gaussian mixture models. Broadly speaking, any parametric model of the traffic classes can be used.

In some implementations, the communication device is configured to automatically send the stored data traffic that the anomaly detector predicts to be different from the observed traffic patterns and receive an updated anomaly detector and/or an updated traffic classifier, the updated anomaly detector being configured to predict whether traffic differs from second set of observed traffic patterns.

In some implementations, the communication device is configured to receive an updated traffic classifier and use the updated traffic classifier in place of the traffic classifier, the updated traffic classifier being configured to recognize or predict at least one connection or data flow type that the traffic classifier did not predict before being updated.

In another general aspect, a method includes: receiving, by a communication device, data traffic; evaluating, by the communication device, the data traffic using an anomaly detector comprising a machine learning model trained to predict whether data traffic patterns differ from a set of observed traffic patterns present in a set of training data; using, by the communication device, a traffic classifier comprising a machine learning model to predict a quality of service (QoS) class for network connections or data flows for traffic that the anomaly detector predicts to be similar to the observed traffic patterns; and storing, by the communication device, data traffic that the anomaly detector predicts to be different from the observed traffic patterns.

In some implementations, the method comprises: periodically sending the stored data traffic that the anomaly detector predicts to be different from the observed traffic patterns to a machine learning model update system; and receiving an updated anomaly detector and an updated traffic classifier that each have a training state that is updated based on traffic labeled anomalous by the anomaly detector of one or more terminals. In some cases, the updates improve accuracy, performance, reliability, or other characteristics of the anomaly detector and traffic classifier. In some cases, the updated anomaly detector can be one that has been updated, based on data from one or more terminals, to identify one or more additional types of traffic that the anomaly detector before the update was not configured to identify. The updated traffic classifier can be one that can classify the one or more additional types of traffic into quality of service (QoS) classes.

In some implementations, the method includes assigning a default QoS class to traffic that the anomaly detector predicts to be different from the observed traffic patterns.

In some implementations, assigning the default QoS class comprises bypassing evaluation by the traffic classifier of the traffic that the anomaly detector predicts to be different from the observed traffic patterns.

In some implementations, the communication device is a satellite communication device.

In some implementations, the method includes using a history-based classifier to predict a QoS class for traffic based on history data indicating prior QoS classes assigned to connections.

In some implementations, the history-based classifier is configured to predict the QoS class based on input comprising at least one of an IP address, a server name indication, a domain name, or a fully qualified domain name.

In some implementations, the method includes: selecting between a first QoS class predicted by the traffic classifier and a second QoS class predicted by the history-based classifier; and storing the selected QoS class in connection history data used by the history-based classifier.

In some implementations, the method includes identifying a beginning and an end of objects in network connections, wherein the traffic classifier is configured to output a prediction of a QoS class for each of the objects in the network connections.

In some implementations, the anomaly detector and the traffic classifier are each configured to generate predictions for encrypted data traffic based on at least one of packet-level information, object-level information, or application layer information.

In some implementations, the machine learning model of the anomaly detector comprises a trained neural network, and wherein the machine learning model of the traffic classifier comprises a trained neural network.

In some implementations, the method includes automatically sending the stored data traffic that the anomaly detector predicts to be different from the observed traffic patterns and receiving an updated anomaly detector and/or an updated traffic classifier, the updated anomaly detector being configured to predict whether traffic differs from second set of observed traffic patterns.

In some implementations, the method includes receiving an updated traffic classifier and using the updated traffic classifier in place of the traffic classifier, the updated traffic classifier being configured to recognize or predict at least one connection or data flow type that the traffic classifier did not predict before being updated.

Other embodiments of these and other aspects disclosed herein include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Various techniques disclosed herein enable a system to classify traffic into QoS traffic classes reliably and as soon as possible, so that connection delivery can be prioritized and/or scheduled to satisfy user requirements and system constraints. The system can use several techniques to achieve fast and accurate classification. These techniques include history-based classification, machine-learning-based classification (e.g., to make classifications based on measured traffic characteristics), and the use of an anomaly detector to automatically improve the machine-learning-based classification model and the overall system. The classification output by the technique corresponds to a QoS traffic class, and can be directly incorporated into existing queueing and servicing pipelines.

Traffic classification is often important for Internet service providers (ISPs) and network administrators. Some common use cases include prioritization and scheduling different TCP connections/flows and applications according to QoS requirements. Information about the traffic class can also be used to better manage system and network resources to ensure the most efficient transmission.

A system provides a self-improving or self-learning system for traffic classification. The traffic classifier can be a parametric machine learning system trained using some data with ground truth from one or more client devices, and fine-tuned using data collected from terminals in the field. When a traffic classifier is deployed, it may encounter traffic patterns for which examples were not collected and used during the training phase of the models. To address these new patterns, the system provides mechanisms to improve the traffic classifier as terminals encounter new data patterns. Model improvement can be achieved by fine-tuning the model parameters.

When machine learning models are deployed into production, it is advantageous to repeatedly and even continually monitored their performance. The parameters of the models can be repeatedly updated so that the models effectively handle the ever-changing traffic landscape. For instance, as different websites serve different types of content, the fundamental definitions of traffic requiring low latency (e.g., transfers representing interactive content), streaming traffic, and bulk connections keep changing. A traffic classification model preferably has checks and balances to deal with the emergence of new traffic patterns and to alleviate the effects of changing or shifting characteristics of traffic classes.

Figure 1:
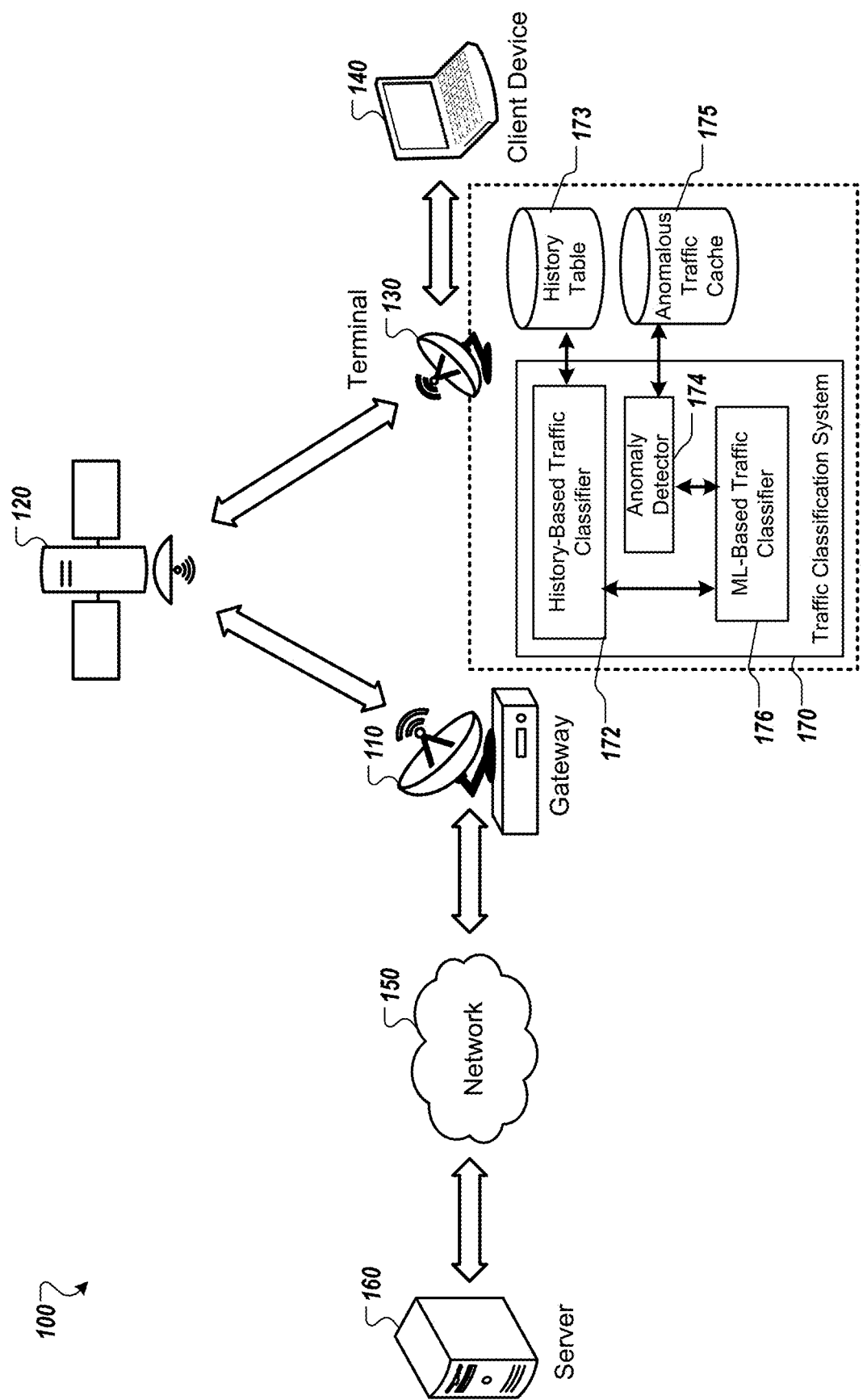
FIG. 1 is a block diagram that illustrates an example of a communication system.

FIG. 1 is a block diagram that illustrates an example of a communication system 100. The example of FIG. 1 shows a satellite communication system, but the techniques herein can be applied to communication systems that do not involve satellites. In the example of FIG. 1, a client device 140 obtains network service through a connection with a satellite terminal 130. The terminal 130 communicates wirelessly with a satellite 120, which in turn communicates wirelessly with a gateway 110. The gateway 110 then connects to a network 150 to provide connections to servers and devices, for example, server 160. The network 150 can include public and/or private networks, and can include the Internet. The client device 140 can be any appropriate device that can transfer data over a network, for example, a phone, a laptop computer, a desktop computer, a wearable device, etc.

In the system 100, the terminal 130 includes a traffic classification system 170 that can classify traffic into QoS traffic classes. Classification information is provided to a scheduler of the terminal 130 to prioritize and transfer the traffic appropriately. The traffic classification system 170 can be configured to generate a classification prediction for every connection (e.g., each TCP/IP connection, each HTTP connection, etc.).

In addition, the traffic classification system can be configured to generate a classification prediction for each object of each connection, so that multiple predictions are output over the course of a connection. In some implementations, objects in a connection (e.g., HTTP objects or other objects), for example, the beginning and end of objects in a data flow, are estimated using the techniques described in U.S. Pat. No. 10,454,804, issued on Oct. 22, 2019 and titled "Application characterization using transport protocol analysis," the entirety of which is incorporated by reference herein.

In some implementations, the traffic classification system 170 can estimate or derive application-layer metrics using TCP state machine statistics for a TCP connection. This can be done by analyzing the sequence of requests from the client device 140 and responses from the server 160, the sizes of messages in packets and bytes, the relative timestamps, and so on. This yields more detailed information about object-level exchanges that happen over the connection or data flow. Several other machine learning models can ingest estimated object-level statistics (e.g., the anomaly detector 174 and ML-based traffic classifier). The traffic classification system 170 and models 174, 176 are part of a self-learning system, and are more accurate compared to the models that use only connection-level or flow-level statistics. In situations where it is practical or beneficial to use connection-level or flow-level features, models trained on them can be incorporated into the traffic classification system 170.

The traffic classification system 170 can be configured to collect traffic statistics for data transferred in both directions (e.g., to and from the terminal 130) and to generate higher layer metrics and estimates. The traffic classification system 170 and/or the client device 140 can collect data for training the machine learning models. The collected data can include traffic flow information, statistics, and estimates of classifications (e.g., based on server name information, IP address, and so on). In some implementations, when available, the client device 140 may collect and provide ground-truth information (e.g., information indicating the type of traffic corresponding to an encrypted data stream). The system 100 can adapt machine learning models (e.g., the anomaly detector 174 and the ML-based traffic classifier 176) to make classifications based on data of the terminal 130. Often, client devices are the only places to obtain accurate labels for data, and the client device data is used to provide examples for training the models. The operation of the system 100 can reduce the reliance on data from the client device 140. In some implementations, the model adaptation can be additionally or alternatively performed using data collected by the terminal 130.

The traffic classification system 170 includes a history-based classifier 172, a machine-learning-based (ML-based) traffic classifier 176 and an ML-based anomaly detector 174. The history-based classifier 172 (and/or other components of the terminal 130) stores data about connections in a history table 173. The history-based classifier 172 and also uses the data in the history table 173 to classify new data flows. The history-based classifier 172 can operate as described in U.S. Pat. No. 10,341,241, which is incorporated herein by reference. The terminal 130 also has an anomalous traffic cache 175 that stores information about traffic that the anomaly detector 174 determines to be unusual or different from expected distributions. Anomalous traffic information is stored in the cache 175 over a time window, and can then be used for further training the anomaly detector 174 and the ML-based traffic classifier 176. For example, the anomalous traffic information can be provided to the gateway 110 or another device to perform the updated training, and updated models 174, 176 can be provided to the terminal 130 and other terminals. The ML-based traffic classifier 176 can be used to provide information to the history-based traffic classifier 172, for example, to correct incorrect classifications made by the history-based traffic classifier 172.

The terminal 130 can include an outdoor unit (ODU) such as an antenna, and an indoor unit (IDU) performing signal processing and data processing. The traffic classification system 170 can be implemented at the IDU.

In some implementations, the traffic classification system 170 is configured to classify encrypted traffic. In some implementations, different traffic classification systems or models can be used for encrypted traffic and non-encrypted traffic, because different input information may be available for these different types of traffic. In some implementations, a single traffic classification system 170 is used to classify both encrypted and non-encrypted traffic.

The history-based classifier 172 and related functionality can record the classification results for connections, and reuse the same classification when another connection from the same domain or IP address appears. With the advent of HTTP 2.0, QUIC, and as more and more traffic is served from content delivery networks (CDNs), this approach is not effective in all situations. Using the history-based traffic classifier 172, the classification type can sometimes be determined at the start of a data flow due to historical data, such as a history table based on prior connections of a terminal. Having a rough estimate of the traffic type when the connection starts can save a lot of system resources. The history-based classification is also superior to approaches that used the first few packets in a data transfer to predict a classification, which is not very useful for short connections. For new entries in the history table, or for entries with very few previous instances, a confidence score is output to reflect the confidence or level of uncertainty in the classification.

The ML-based traffic classifier 176 can predict a traffic type (e.g., a QoS class) based on measured traffic characteristics. This can provide a more general approach to classification that is effective even when there is no relevant history for history-based classification. The ML-based traffic classifier 176 can provide predictions in real time or substantially in real time. This type of classifier can use various types of information about traffic, such as packet sizes, packet arrival times, amount and frequency of packet traffic, object-level estimates, connection-level estimates, and so on. In some situations, classification based on only metrics like the domain name server (DNS), server name indication (SNI), hostname or fully qualified domain name (FQDN) may be unreliable, because the networking systems are increasingly moving toward encrypting this information. Accordingly, a classifier that can operate using traffic statistics other than these data elements provides a more robust and widely applicable system. In addition, as more and more domains and IP addresses dynamically deliver multiple types of content, predictions that are not based on traffic characteristics may increasingly fail to appropriately classify traffic.

The traffic classifier system 170 can be configured to operate efficiently for various connections. For example, the classification technique can output an updated prediction about a connection at multiple times, for example, after looking at each estimated object in the connection. The system can make these predictions in parallel for all current open connections and can updates their QoS class appropriately in real-time. In some implementations, the ML-based traffic classifier 176 is a neural network.

In some implementations, the ML-based traffic classifier 176 for real-time classification can be supplemented with or replaced with a non-real-time machine learning classifier configured to make a classification once a connection or data flow has ended. One approach is for the ML-based traffic classifier 176 to be supplemented with a non-real-time machine learning model that can fuse object-level and connection-level features (e.g., engineered features) to make a prediction after looking at multiple or even all of the objects in a connection. The non-real-time model can thus be less computationally intensive than the real-time model.

As another approach, a non-real-time traffic classification model can use a machine learning model can be trained to use a summary feature that represents overall characteristics of a connection but may be less accurate than using more fine-grained data. This can be particularly helpful for platforms with very low computational capabilities. Examples of flow-level summary features about a connection include total number of packets, total response size, and so on. Collecting summary features is relatively easy, and the resulting model trained with summary features is small and can run on an embedded system without demanding excessive computational resources. More detailed metrics can be derived upon looking at inter-packet statistics like packet inter-arrival times, packet sizes (in both directions), time to first byte, and so on. All these metrics exist at the packet level.

Both of the approaches for non-real-time machine learning models can be used alongside history-based classifiers (e.g., which can be used for real-time classification) to build a robust classifier system 170, as the history table 173 will quickly reflect the non-real-time machine learning classifier's 176 decisions and allow the history-based classifier 172 to make accurate determinations. The history-based classifier's lookup table (e.g., history table 173) is built using past classifications made using the machine learning classifier 176 for connections with same meta-data such as SNI, IP address, domain name, and so on.

Conventionally, traffic categorization was achieved through caching meta-data about a connection like the corresponding DNS, SNI, and so on. Newer transport layer protocols like QUIC, as well as other techniques such as DNS over HTTPS (DoH) and SNI encryption, can hide or encrypt connection information such as DNS and server name information. These new techniques make conventional traffic categorization all the more difficult. A simple IP-address based categorization may not be accurate when traffic is increasingly served by servers with name-based virtual hosting.

Because a packet's content and destination may not be available to use for classification (e.g., because the packet is encrypted), traffic classification can be performed based on other measured statistics, such as the size and timing of packets and/or objects in a data flow. Machine learning and rule-based models can be used. The models, such as the ML-based traffic classifier 176, can be configured to make predictions about connections based on only on packet and object statistics (e.g., size, timing, etc.) and not on the content or destination of the packets. Changes in protocols, such as from TCP to QUIC, can be addressed by collecting new data and training the model by adjusting the model parameters or adjusting the rules and/or conditions according to the new traffic patterns.

In some cases, rule-based approaches formulate rudimentary conditions that must be satisfied for assignment to a specific traffic class. The set of rules and conditions are often very simple, and so do not require a lot of computational resources to execute and can be reliably run on an embedded system. However, it is difficult to define rule-based models that model traffic patterns accurately and the process often requires a lot of domain expertise and manual effort. Moreover, the set of formulated conditions may not be exhaustive enough to incorporate all the variations possible in field data, and hence these models are often not as accurate as machine learning models.

The anomaly detector 174 can be used to improve the machine learning model 176 and the system 100 automatically. The anomaly detector 174 can be configured to filter out or label irregular traffic, e.g., traffic that does fit expected patterns. For example, regular traffic can be traffic patterns that have a distribution that matches or is within a threshold level of similarity to a distribution observed in training data for the machine learning traffic classifier model. The anomaly detector 174 can be or can include a machine learning model, such as a neural network, that evaluates the extent of this similarity.

Traffic irregularity could be caused by new traffic patterns like real-time communication, traffic from Internet of things (IOT) devices, web-based real-time communications (WebRTC), etc., or by a change in the distribution of existing traffic. In case of new types of traffic being handled, the system will identify and add new traffic classes, which will bolster the capability of the system. In case of changes to previously known types of traffic, the system will expand the definitions of QoS classes, allowing the system to better serve broader types of traffic.

To address irregular traffic, the terminal 130 can cache information about irregular traffic that occurs during a time window. For example, the terminal 130 can store, in a cache, log, and or other form, all data for a connection detected as anomalous, as well as associated meta-data, such as the DNS, SNI, and IP address if possible. If the number of anomalous connections in a particular time window exceeds a pre-set threshold, the terminal 130 can save all the traffic and meta-data seen during that time window, including traffic not detected as anomalous. The saved data, whether for all traffic or only anomalous traffic, can be later used to update the training state of the machine learning models in the system, e.g., a real-time machine learning traffic classifier 176, a non-real-time machine learning traffic classifier, and/or the anomaly detector 174.

In some implementations, automated agents running on the terminal 130 or other customer-premises equipment (CPEs) can collect data corresponding to connections or data flows labelled as anomalous. In some cases, the client device 140 can perform the data collection or assist in storage of the data in the cache 175. Once traffic having specific meta-data is detected as anomalous, data for any and all connections having that specific metadata can be collected. Collected data can then be used to fine-tune the models, e.g., to update the training state through further training. The anomaly detector 174 would be fine-tuned to classify such traffic patterns as not-anomalous, and the traffic classifier 176 (as well as any non-real-time ML-based traffic classifiers) would be fine-tuned to classify such traffic patterns accurately.

In some implementations, a satellite network provider can set up health monitors on each beam of a satellite to collect data. The health monitors can act like client devices, but be in control of the satellite network provider to more accurately capture data for training of the models. In some cases, the health monitors can run known or predetermined tasks so that the resulting traffic patterns can be appropriately labelled for use as examples for training.

Figure 2:
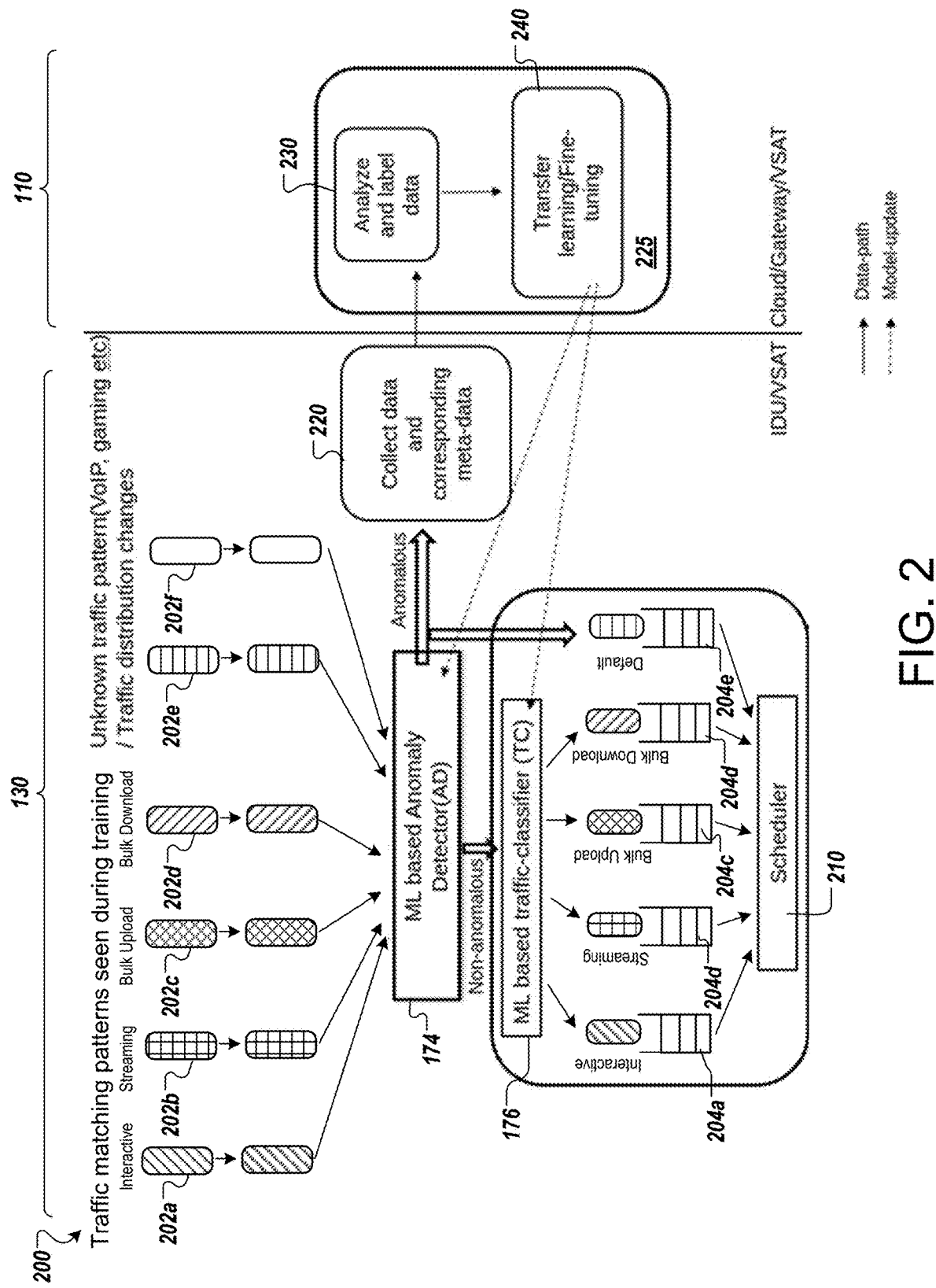
FIG. 2 is a diagram that illustrates an example of a traffic classification pipeline.

FIG. 2 is a diagram that illustrates an example of a traffic classification pipeline 200. This example includes the ML-based anomaly detector 174 and the ML-based traffic classifier 176 of FIG. 1, as well as other components. The example shows various data streams 202a-202f and the process by which they are classified into QoS classes and assigned to queues for transmission by a scheduler 210. Various queues 204a-204e are provided for receiving data to be transferred and providing it to the scheduler 210 for scheduling and transmission.

The left side shows portions of the terminal 130, such as an indoor unit (IDU) (e.g., a processing component of a satellite terminal) or very small aperture terminal (VSAT) (e.g., a ground station). The right side shows functions performed by the gateway 110, but these functions could additionally or alternatively be performed by other components, such as a cloud computing server system, a terminal, etc. In the example of FIG. 2, the history-based classifier 172 is not shown, and the data streams 202a-202f are considered to represent data streams for which history-based classification information is not available (e.g., due to connection data being encrypted or due to the absence of relevant prior connection history to indicate a classification.)

The example shows six data streams 202a-202f to be processed, each composed of various objects. The data stream 202a represents interactive content, such as web traffic, web application data, or other data for an interactive user interface. The data stream 202b represents streaming media content (e.g., audio data, video data, etc.). The data stream 202c represents bulk upload data, and the data stream 202d represents bulk download data. The data stream 202e represents a data stream with an unknown pattern, perhaps VoIP traffic or data related to an online game. The data stream 202f represents data that may be from the same type of data as other streams, but which has a distribution that varies from what is expected (e.g., from the characteristics used to train the ML-based models 174, 176.

The anomaly detector 174 and the ML-based traffic classifier 176 have been previously trained based on examples of traffic patterns similar to each of the data streams 202a-202d, e.g., interactive data, streaming data, bulk upload data, and bulk download data.

The traffic classification system includes a robust self-learning mechanism to adapt to new and/or changing data flow characteristics. The anomaly detector 174 has been trained to track the current distributions of known traffic classes. The anomaly detector 174 can automatically flag new traffic distributions, or flag changes in the distributions of existing classes. The anomaly detector 174 typically does not receive actual packets of data streams 202a-202f, but instead receives values or features derived from the data streams 202a-202f. For example, application layer metrics can be estimated from the incoming traffic connections using TCP-layer statistics which can include packet-level information. The estimated application layer metrics include information about the objects exchanged during the flow or connection, which is then input into the ML-based anomaly detector 174. If connection-level information is available, e.g., IP address, SNI, DNS, FQDN, etc., this information may be provided to and used by the anomaly detector 174 also. The ML-based traffic classifier 176 can be configured to receive and use the same types of information, e.g., TCP-layer information, connection-level information, etc.

Traffic that the anomaly detector 174 does not label as anomalous, such as the first four data streams 202a-202d of recognized types, is directed to the trained ML-based traffic classifier 176. The traffic classifier 176 works robustly for traffic patterns and traffic distributions included in the training data set used to train the traffic classifier 176. The anomaly detector 174 can be trained using the same training data, and so can accurately detect which traffic types are recognizable to the traffic classifier 176. In effect, the anomaly detector 174 filters out anomalous traffic so that the traffic classifier 176 is used to classify data streams having patterns and characteristics allowing the traffic classifier 176 to classify with relatively high confidence, because the traffic is similar to traffic examples used for training. Based on the classifications of the ML-based traffic classifier 176, the data from the data streams 202a-202d is distributed to respective queues 204a-204d each corresponding to a different QoS class (e.g., interactive, streaming, bulk upload, bulk download).

Traffic that the anomaly detector 174 labels as anomalous is not provided to the ML-based traffic classifier 176, but instead is sent directly to a queue 204e so it can be provided to the scheduler 204. For example, traffic labeled anomalous can bypass the step of classification using the classifier 176 and be provide to a queue 204e for a default or general QoS class. In some implementations, instead of being labeled for default QoS class, the traffic labeled anomalous is assigned a QoS class determined by the history-based classifier 172, if there is relevant history to support a classification in this manner.

Traffic labeled as anomalous is also collected by data collection functionality 220, along with associated meta-data such as a relevant IP address, a server name indication, a DNS, a FQDN, etc. This data can be stored in a cache 175 (see FIG. 1) that is periodically flushed by sending the data to the gateway 110 or other system configured to receive and process the collected data. The collected information can be recorded for later analysis and labelling or use as training data for further training the machine learning models 174, 176. The meta-data fields are often available now, but may soon be encrypted in the future, in which case traffic classification will be based on traffic patterns (e.g., packet characteristics and statistics).

The gateway 110 or other system can include an analysis module 230 configured to analyze and label data. The data that is collected can be obtained from multiple terminals, including optionally for terminals using different connection types, at different geographic areas, etc. The analysis module 230 can determine appropriate classifications for collected anomalous traffic, and label the traffic with the correct QoS class. The label can be used as a target output for training of the ML-based traffic classifier 176. The labeled data is provided to a model training module 240 that manages further training of the models 174, 176 and then periodically provides the updated models back to terminals, for example, over a network. Terminals receive these model updates and begin using the new models (e.g., models 174, 176 having an improved or refined training state, such as the set of internal parameters such as neural network weights). After the update, the traffic classifier 176 can be configured to recognize a wider range of traffic patterns, e.g., to add categories or data types that are recognized and/or to expand the traffic patterns that are recognized as corresponding to previously defined categories. The updated anomaly detector 174 can be updated to consider the newly recognized traffic patterns as not anomalous, so the updated anomaly detector 174 does not filter out the new types of traffic that the updated traffic classifier 176 has been updated to recognize.

The machine learning models can be parametric and can be tuned according to an objective function. In some implementations, input data is in the form of a sequence of floating point vectors, with each vector representing features of one estimated application layer object. To summarize the roles of the system, the anomaly detector 174 can discover traffic with characteristics different from training data, the ML-based traffic classifier 176 can categorize data flows into QoS classes, and model update components analyze new and/or changing traffic and improve the classification accuracy and thus QoS performance of the overall system.

Figure 3:
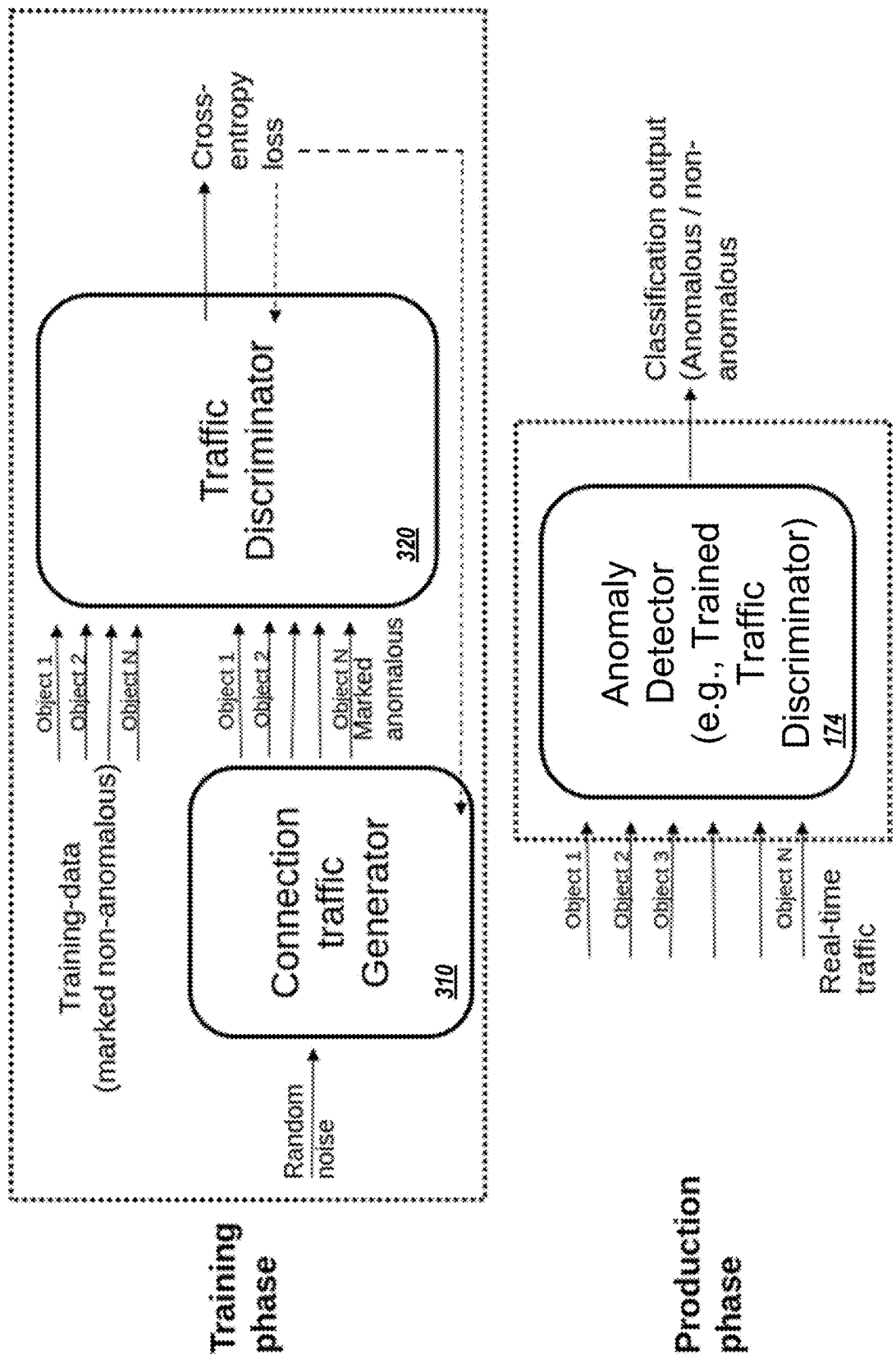
FIG. 3 is a diagram that illustrates an example of a machine-learning-based anomaly detector.

FIG. 3 is a diagram that illustrates an example of a machine-learning-based anomaly detector 174 and techniques for training the anomaly detector 174. In some implementations, the anomaly detector 174 is trained using generative adversarial networks.

The anomaly detector 174 can be trained to identify when a traffic pattern is moving away from regularity. Anomalous traffic identification is also helpful for network diagnostics applications, to analyze or pinpoint the reasons for a network congestion or for a decrease in throughput.

Traffic irregularity may be caused by new traffic patterns, such as real-time communication, IoT, Web-RTC etc., or a change in the distribution of existing traffic. In case of new traffic patterns, the system can identify and add new traffic classes and bolster the capability of the system. In case of changing distributions, the system expands the definitions of QoS classes and can better serve broader types of traffic. This anomaly in traffic pattern may be caused by changes in traffic distributions of known traffic classes or a result of new traffic pattern that was not seen during the training phase.

It is not feasible to collect training data that can encompass all the possible traffic patterns from all domains and applications. For example, YouTube, Netflix and Facebook video may all differ in their inherent application layer statistics, or packet-level footprints and estimated application layer metrics. The anomaly detector 174 is capable of identifying video traffic from different sources. The ability to identify video sources is important because the training data may not contain data from those particular sources, and the knowledge of this information is important for improving traffic classifier performance. As noted above, there is can be a feedback loop to utilize the identified anomalous traffic and improve the anomaly detector 174 and the traffic classifier 176.

One technique for training the anomaly detector using Generative-adversarial networks (GANs). A GAN is a combination of two competing models, e.g., neural networks, that learn to achieve their objectives by trying to fool each other. It contains two main components, a traffic discriminator 310 and a connection traffic generator 320. The traffic discriminator 320 can be a binary classifier neural network that can look at estimated application layer metrics, and make a prediction about the connection (e.g., whether traffic is anomalous or non-anomalous). It is challenging to train this discriminator because of lack of data for anomalous traffic, as the system designer would not have any anomalous traffic during initial training. To mitigate this limitation, the connection traffic generator 310 can be used to arbitrarily generate application layer data that can then be ingested into the traffic discriminator 320. This combination of neural networks is trained in an adversarial manner, e.g., the connection generator 310 is trained to generate connections that fool the traffic discriminator 320 into thinking the connections are real and valid patterns. Similarly, the discriminator 320 is trained to identify connections that come from the connection generator 310 and are thus anomalous. After several rounds of iterative training, the connection generator 310 will learn to produce connection data that resembles the connections in the training data, and the traffic discriminator 320 gets better at telling irregular connection traffic from regular ones. The trained discriminator 320 is then used in standalone mode during production as the ML-based anomaly detector 174 as shown in FIG. 1.

The trained discriminator 320 is deployed as the final anomaly detector 174 in production phase. During this phase, all connections are first tested for anomalous nature by passing them through the anomaly detector 174. The non-anomalous connections are similar in distribution to the training data, and so the traffic classifier 176 is expected to be able to reliably classify them. The traffic classifier 176 then bins the non-anomalous connections into a set of predefined classes as shown in FIG. 2, which are then forwarded to the scheduler 210. The flows classified as anomalous are binned into a default class (e.g., for queue 202e) which is directly forwarded to the scheduler 210.

Figure 4:
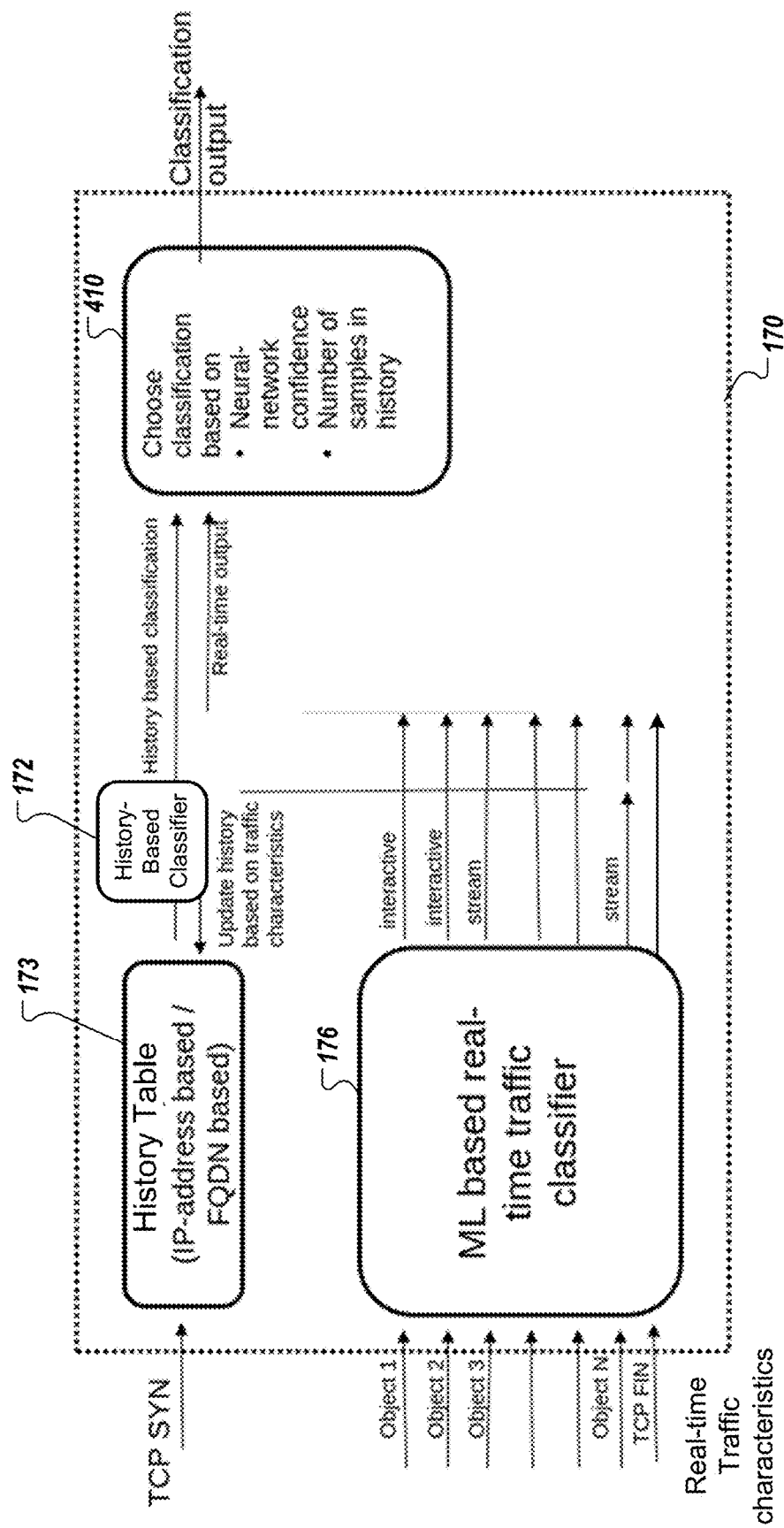
FIG. 4 is a diagram that illustrates an example of a machine-learning-based traffic classifier.

FIG. 4 is a diagram that illustrates an example of a machine-learning-based traffic classifier 176 and a history-based traffic classifier 172. The machine-learning-based traffic classifier 176 can be configured to operate in real-time or substantially in real-time, for example, to classify data flows as they are transferred so that the priority or QoS class can be set appropriately. The example of FIG. 4 also shows how the history-based classifier 172 and the ML-based classifier 176 can be used together. For example, a selector module 410 can be used to choose between the classification from the two classifiers 172, 176, based on factors such as (1) a confidence score from the machine learning classifier 176 (e.g., indicating how confident the classifier 176 is in its classification, or how well the current traffic pattern matches the predicted class) and (2) a number of relevant samples in the history table 173 (e.g., the extent and consistency of the history information in showing a classification). For clarity, the example of FIG. 4 omits illustration of the anomaly detector 174, the scheduler 210, and components for updating the machine learning models.

The history-based classifier 172 can perform classification by analyzing connection meta-data like DNS, SNI, and so on. These elements are often available in headers available at the beginning of the connection, and do not require any overhead to acquire. However, classification based on metrics like DNS, SNI, host-name, or FQDN are not always reliable because the networking community is pushing to encrypt those headers. Also, as more and more domains and IP-addresses dynamically deliver multiple types of content, predictions based on traffic characteristics become more and more important.

The ML-based traffic classifier 176 identifies different traffic patterns and categorizes them into bins. These binned connections are prioritized and scheduled after accounting for user requirements, user satisfaction, system load, and system health. To effectively utilize the limited amount of resources in a satellite connection, it is extremely valuable to know the latency requirements of any particular connection, as that is a good predictor of user expectation and system load.

The traffic classification can use the history-based classifier 172 and the ML-based real-time classifier 176. The history-based classifier 172 utilizes the available connection meta-data, and looks up predictions of the traffic classification system 170 on past connections with same meta-data. This prediction is available at the beginning of the connection/flow. The ML-based real-time classifier 176 can analyze the estimated objects exchanged through the TCP connection/flow, and make a prediction after every object. This ensures that the system does not have to wait for the connection/flow to end before coming up with a prediction based on traffic characteristics.

The ML-based real time classifier 176 can be any parametric model whose weights can by tuned according to an objective function. It can be any appropriate machine learning model, such as a linear regression model, random forests, a neural network, a rule-based classifier whose conditional parameters can be adjusted according to some objective function (e.g., classification accuracy), or another model.

Figure 5A:
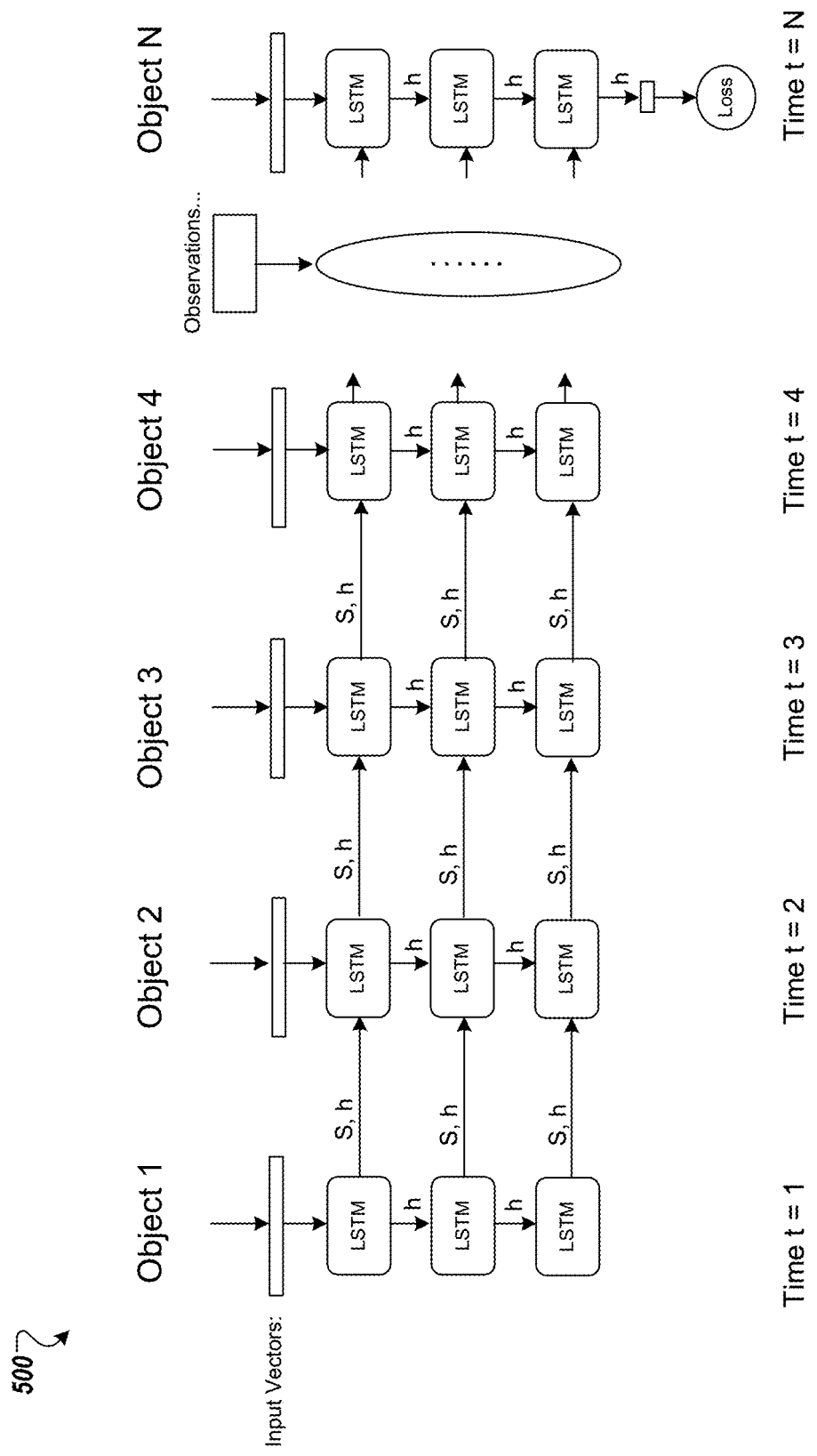
FIG. 5A is a diagram that illustrates an example of a traffic classifier having a recurrent neural network architecture.
Figure 5B:
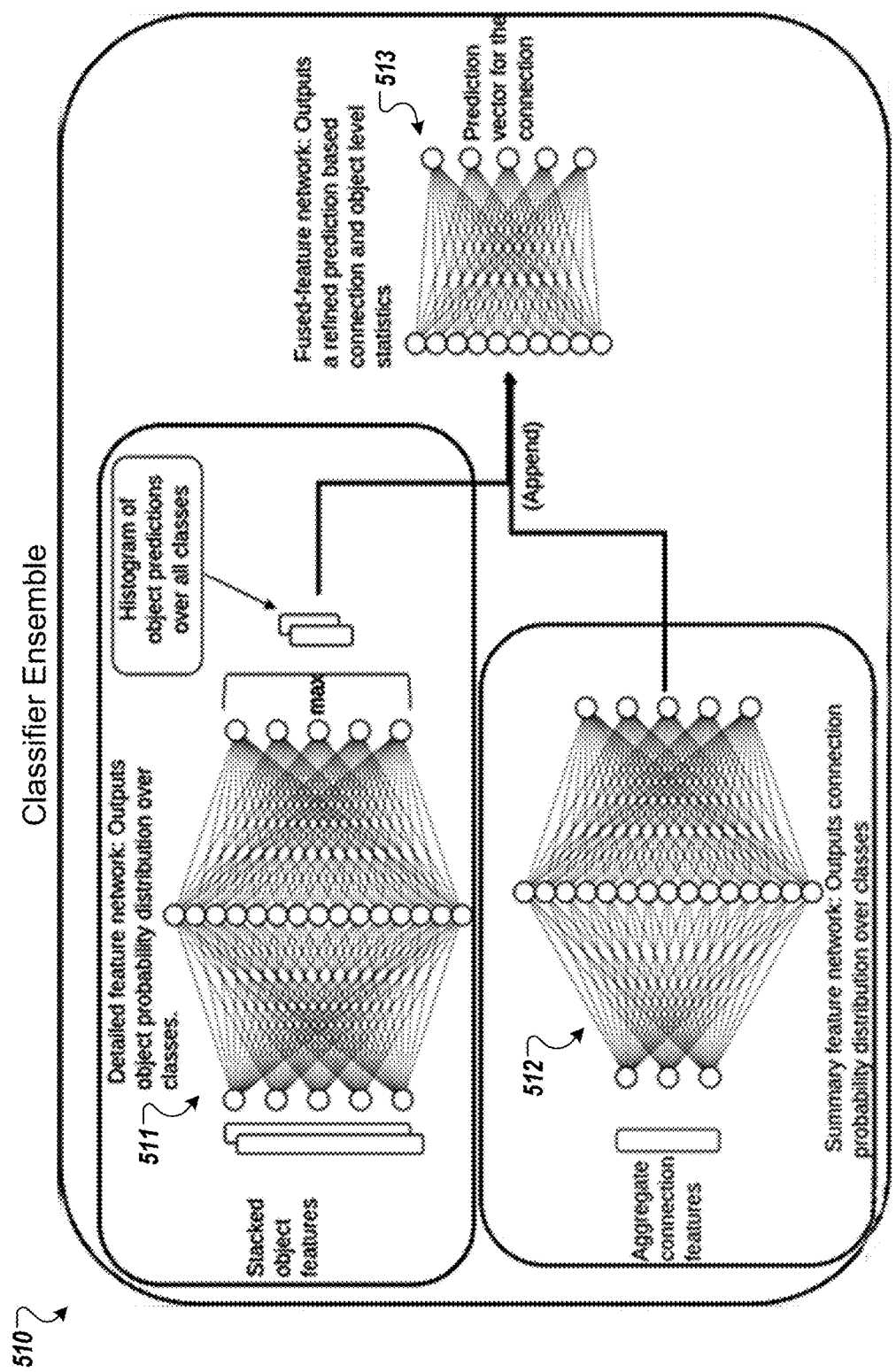
FIG. 5B is a diagram that illustrates an example of a traffic classifier having a feed-forward neural network architecture.

In some implementations, a trained deep recurrent neural network (RNN) is used as ML-based real time classifier 176. The RNN will sequentially receive information about each object as input, and will maintain an internal state about the connection. This internal state can then be used to extract information, e.g., a prediction as indicated by output at an output layer of the RNN, about the type of connection or data flow. An example of an RNN model is shown in FIG. 5A. An example of a feed-forward neural network architecture for the classifier 176 is shown in FIG. 5B.

The final prediction is decided based on predictions made by both classifiers 511, 512 after every observed application layer object in the connection. The neural network returns a confidence score for each of the classes that add up to 100%, and the history-based classifier returns its prediction along with number of samples in the history that have the same connection meta-data. This is one of various possible methods to obtain a final prediction.

Training data and corresponding ground truth labels can be collected in large quantities on a client device using browser automation scripts. This data is an accurate representation of application layer metrics, and the corresponding ground truth labels are automatically marked by the browser. Ideally, the model is to be tested on real field data, which is an estimate of the data on client device. To obtain labels for testing, a small subset of CPE can be selectively labeled. The true application layer data and its estimates at the CPE contain HTTP object level statistics like duration of exchange, time to first byte, response time, request size, and response size for each object. For each connection, the data is a variable-sized sequence of feature vectors for each object, with size of the sequence being the number of objects exchanged in that connection or data flow.

FIG. 5A is a diagram that illustrates an example of a machine learning-based traffic classifier 500 having a recurrent neural network architecture. This example shows a schematic of the RNN applied to application layer objects. A significant advantage of model shown in FIG. 5A is that it can make predictions in real-time, e.g., at every point of time from TCP connection establishment to TCP connection close, the system can generate a prediction about the connection. In the figure, each vertical section represents the state of the RNN at a different time step (e.g., t=1, 2, 3, . . . ) to show how the state of the RNN at one time step is saved and propagated to affect the state (and thus output) of the RNN at the next time step.

FIG. 5B is a diagram that illustrates an example of a traffic classifier 510 having a feed-forward neural network architecture. This example shows another model that can be used instead of the one in FIG. 5A. In FIG. 5B, two different individual models 511, 512 are fused together by another neural network 513. Each of those individual models 511, 512 can be used as standalone ML-based traffic classifiers. In applications where there is strong dearth of computational resources, the summary feature network 512 can be used, which is a tiny network that takes in summary features about a connection and outputs rough prediction about the connection.

Figure 6:
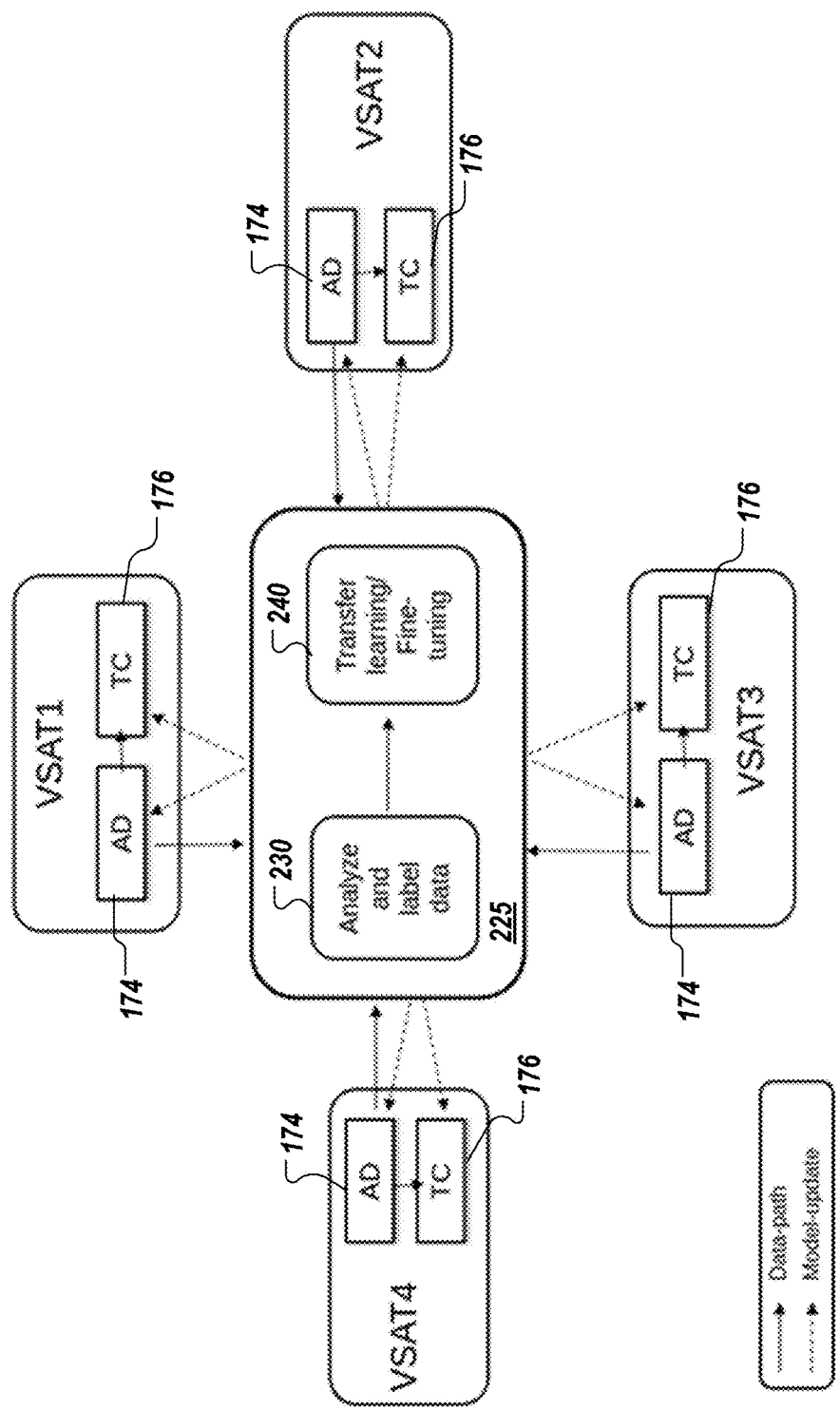
FIG. 6 is a diagram that illustrates an example of updating models used in a communication system.

FIG. 6 is a diagram that illustrates an example of updating models used in a communication system.

As discussed above, when the anomaly detector 174 labels a connection as anomalous, it means that the connection or data flow has a traffic pattern different from flows seen during training. As mentioned previously, one of the factors that could possibly cause this is class distribution changes because of an update to the application. Another factor that could cause onset of anomalous connection is if a new type of traffic pattern emerges like VoIP or gaming. The model update module 225 will collect information about such events and trigger an update to the anomaly detector and traffic classifier models.

The model update module 225 collects anomalous data connections and its corresponding available meta-data present in DNS packets and client data, like SNI, DNS and IP-address. This data can then be periodically uploaded to a secure central data-center or gateway for future analysis and labeling. Although for effective training of machine learning models one needs enough computational resources usually available at central servers, we can also utilize some techniques in machine learning literature to perform some rudimentary training at the CPE.

The anomaly detector 174 can also be used without the model update module 225 using some heuristics based on domain knowledge. For example, one can detect the onset of new application using a simple heuristic like if the number of anomalous connections in a particular time-window exceeds a pre-set threshold, we flag the application that generated the connection as "unknown". This can aid in identifying network diagnostic issues arising out of a particular application. In addition to such simple checks on the CPE itself, we also propose a self-learning mechanism Processing the anomalous data accumulated from thousands of CPEs poses itself as a distributed machine learning problem. Some CPEs could periodically upload their data and/or meta-data to a central server/Gateway where the existing machine learning model would be fine-tuned and updated using the uploaded data. The updated model would then be pushed into each of the CPEs, and would now have the capability to classify new types of traffic that were previously classified as anomalous.

Two different mechanisms can be used for processing the uploaded data. We could have a human-in-the-loop mechanism wherein the content-type of the saved data is labeled by humans.

The other mechanism to deal with data collected at the cloud is to employ domain adaptation techniques. A parametric model, like a deep neural network, is a stack of different representations of the input data or, in other words, an output of a series of function compositions. The neural network learns to adjust its function layers so as to minimize the cost function as much as possible. The intermediate outputs it generates between input and final layer are otherwise called internal representations of the network. Domain adaptation seeks to learn a representation that not only minimizes the training objective but also better generalizes to unseen data from different domains. The model is fine-tuned by showing training data with labels, and domain offset field data without labels.

Using either of the above-mentioned training procedures, both ML-based anomaly detector 174 and the ML-based traffic classifier 176 would then be updated. The anomaly detector 174 would be fine-tuned to classify the collected anomalous traffic as non-anomalous, and the traffic classifier 176 would be fine-tuned to classify those anomalous traffic patterns accurately in the future.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them.

Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A communication device comprising:
   an anomaly detector comprising a machine learning model trained to predict whether data traffic patterns differ from a set of observed traffic patterns present in a set of training data; and
   a traffic classifier comprising a machine learning model trained to predict a quality of service (QoS) class for network connections or data flows;
   wherein the communication device is configured to evaluate network connections or data flows using the anomaly detector, wherein the communication device is configured to (i) use the traffic classifier to predict QoS classes for traffic that the anomaly detector predicts to be similar to the observed traffic patterns, and (ii) store data traffic that the anomaly detector predicts to be different from the observed traffic patterns.

2. The communication device of claim 1, further configured to:
   periodically send the stored data traffic that the anomaly detector predicts to be different from the observed traffic patterns to a machine learning model update system; and
   receive an updated anomaly detector and an updated traffic classifier that each have a training state that is updated based on traffic labeled anomalous by the anomaly detector of one or more communication devices.

3. The communication device of claim 1, further configured assign a default QoS class to traffic that the anomaly detector predicts to be different from the observed traffic patterns.

4. The communication device of claim 3, wherein to assign the default QoS class, the communication device is configured to bypass evaluation by the traffic classifier of the traffic that the anomaly detector predicts to be different from the observed traffic patterns.

5. The communication device of claim 1, wherein the communication device is a satellite communication terminal.

6. The communication device of claim 1, further comprising a history-based classifier configured to predict a QoS class for traffic based on history data indicating prior QoS classes assigned to connections.

7. The communication device of claim 6, wherein the history-based classifier is configured to predict the QoS class based on input comprising at least one of an IP address, a server name indication, a domain name, or a fully qualified domain name.

8. The communication device of claim 6, further comprising a selector configured to select between a first QoS class predicted by the traffic classifier and a second QoS class predicted by the history-based classifier; and
   store the selected QoS class in connection history data used by the history-based classifier.

9. The communication device of claim 1, wherein the communication device is configured to identify a beginning and end of objects in network connections, wherein the traffic classifier is configured to output a prediction of a QoS class for each of the objects in the network connections.

10. The communication device of claim 1, wherein the anomaly detector and the traffic classifier are each configured to generate predictions for encrypted data traffic based on at least one of packet-level information, object-level information, or application layer information.

11. The communication device of claim 1, wherein the machine learning model of the anomaly detector comprises a trained neural network, and wherein the machine learning model of the traffic classifier comprises a trained neural network.

12. The communication device of claim 1, configured to automatically send the stored data traffic that the anomaly detector predicts to be different from the observed traffic patterns and receive an updated anomaly detector and/or an updated traffic classifier, the updated anomaly detector being configured to predict whether traffic differs from second set of observed traffic patterns.

13. The communication device of claim 1, configured to receive an updated traffic classifier and use the updated traffic classifier in place of the traffic classifier, the updated traffic classifier being configured to recognize or predict at least one connection or data flow type that the traffic classifier did not predict before being updated.

14. The communication device of claim 1, wherein the machine learning model of the traffic classifier and the machine learning model of the anomaly detector are each trained based on the set of training data; and
   wherein the machine learning model is trained to identify data traffic patterns that differ from the set of observed traffic patterns present in the set of training data used to train the machine learning model of the traffic classifier.

15. The communication device of claim 1, wherein the communication device is configured to apply a predetermined QoS class for traffic that the anomaly detector predicts to be different from the observed traffic patterns that is not based on analysis by the traffic classifier.

16. The communication device of claim 1, wherein the communication device is configured to selectively use the traffic classifier to predict QoS classes for traffic at the communication device based on predictions of the anomaly detector, including (i) using the traffic classifier to predict QoS classes for first traffic that the anomaly detector predicts to be similar to the observed traffic patterns, and (ii) bypassing the traffic classifier for second traffic that the anomaly detector predicts to be different from the observed traffic patterns, such that the traffic classifier is not used to predict QoS classes for the second traffic.

17. A method comprising:
    receiving, by a communication device, data traffic;

evaluating, by the communication device, the data traffic using an anomaly detector comprising a machine learning model trained to predict whether data traffic patterns differ from a set of observed traffic patterns present in a set of training data;

using, by the communication device, a traffic classifier comprising a machine learning model to predict a quality of service (QoS) class for network connections or data flows for traffic that the anomaly detector predicts to be similar to the observed traffic patterns; and storing, by the communication device, data traffic that the anomaly detector predicts to be different from the observed traffic patterns.

18. The method of claim 17, comprising, before processing data traffic with the traffic classifier, filtering the data traffic such that data traffic the anomaly detector predicts to be different from the observed traffic patterns is not analyzed by the traffic classifier.

19. The method of claim 17, comprising periodically sending the stored data traffic that the anomaly detector predicts to be different from the observed traffic patterns to a machine learning model update system; and receiving an updated anomaly detector and an updated traffic classifier that each have a training state that is updated based on traffic labeled anomalous by the anomaly detector of one or more terminals.

20. One or more non-transitory machine-readable media storing instructions that, when executed by one or more processors of a communication device, cause the communication device to perform operations comprising:

receiving data traffic;

evaluating the data traffic using an anomaly detector comprising a machine learning model trained to predict whether data traffic patterns differ from a set of observed traffic patterns present in a set of training data;

using a traffic classifier comprising a machine learning model to predict a quality of service (QoS) class for network connections or data flows for traffic that the anomaly detector predicts to be similar to the observed traffic patterns; and storing data traffic that the anomaly detector predicts to be different from the observed traffic patterns.

* * * * *